(12) United States Patent
Ammler et al.

(10) Patent No.: US 10,590,876 B2
(45) Date of Patent: Mar. 17, 2020

(54) METHOD FOR OPERATING A TRANSMISSION DEVICE, AND CORRESPONDING TRANSMISSION DEVICE

(71) Applicant: AUDI AG, Ingolstadt (DE)

(72) Inventors: Stefan Ammler, Bergheim (DE); Florian Bauer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 198 days.

(21) Appl. No.: 15/518,924

(22) PCT Filed: Oct. 28, 2015

(86) PCT No.: PCT/EP2015/074996
§ 371 (c)(1),
(2) Date: Apr. 13, 2017

(87) PCT Pub. No.: WO2016/066692
PCT Pub. Date: May 6, 2016

(65) Prior Publication Data
US 2017/0218869 A1 Aug. 3, 2017

(30) Foreign Application Priority Data
Oct. 29, 2014 (DE) .......................... 10 2014 016 075

(51) Int. Cl.
*F02D 41/04* (2006.01)
*F16H 59/72* (2006.01)
(Continued)

(52) U.S. Cl.
CPC ............. *F02D 41/04* (2013.01); *F02D 41/00* (2013.01); *F02D 41/02* (2013.01);
(Continued)

(58) Field of Classification Search
CPC .......... F02D 41/04; F02D 41/02; F02D 41/00; F02D 41/086; F02D 41/045;
(Continued)

(56) References Cited

U.S. PATENT DOCUMENTS

| | | | |
|---|---|---|---|
| 2009/0012680 A1* | 1/2009 | Kley | B60T 10/02 701/51 |
| 2013/0253784 A1* | 9/2013 | MacMillian | F02D 29/02 701/51 |

FOREIGN PATENT DOCUMENTS

| | | |
|---|---|---|
| CN | 1906069 A | 1/2007 |
| CN | 103210229 A | 7/2013 |

(Continued)

OTHER PUBLICATIONS

JP-11344110-A—English Translation (Year: 1998).*
(Continued)

*Primary Examiner* — Joseph J Dallo
*Assistant Examiner* — Scott A Reinbold
(74) *Attorney, Agent, or Firm* — Maier & Maier, PLLC

(57) ABSTRACT

A method for operating a transmission device and a transmission with at least one oil chamber, in which is arranged a wheelset of the transmission device. At the same time, in order to determine the temperature in the oil chamber, an overall level is determined for the oil chamber, wherein an initial value is determined from the overall energy level at the start of the operation of the transmission device with the following steps: determination of a standardized shutdown time as a function of an external temperature and of the overall energy level that is present with the shutdown of the transmission device, determination of a corrected shutdown time as a function of the standardized shutdown time and a measured shutdown time, and determination of the initial (Continued)

value as a function of the corrected shutdown time and of the momentary external temperature.

10 Claims, 2 Drawing Sheets

(51) Int. Cl.
    *F16H 57/04*     (2010.01)
    *F02D 41/00*     (2006.01)
    *F02D 41/02*     (2006.01)

(52) U.S. Cl.
    CPC ......... *F16H 57/0413* (2013.01); *F16H 59/72* (2013.01); *F16H 2059/725* (2013.01)

(58) Field of Classification Search
    CPC ............. F02D 41/042; F02D 2200/023; F02D 2200/1006; F16H 59/72; F16H 57/0413; F16H 2059/725
    USPC .................................................... 123/339.22
    See application file for complete search history.

(56) References Cited

FOREIGN PATENT DOCUMENTS

| | | |
|---|---|---|
| DE | 3108242 A1 | 11/1982 |
| DE | 10043423 A1 | 4/2001 |
| DE | 102007021524 A1 | 11/2008 |
| DE | 102008053387 A1 | 5/2009 |
| DE | 102011085750 A1 | 5/2012 |
| JP | 11344110 A * | 12/1999 |

OTHER PUBLICATIONS

German Office Action dated Jul. 2, 2015 of corresponding application No. DE 10 2014 016 075.0; 5 pgs.
International Search Report dated Feb. 9, 2016 of corresponding application No. PCT/EP2015/074996; 13 pgs.
Office Action dated Jun. 25, 2018 in corresponding Chinese Application No. 201580058896.1; 6 pages.
Translation of the International Preliminary Report on Patentability dated May 11, 2017, in connection with corresponding international Application No. PCT/EP2015/074996 (9 pgs).

* cited by examiner

METHOD FOR OPERATING A TRANSMISSION DEVICE, AND CORRESPONDING TRANSMISSION DEVICE

BACKGROUND

The invention relates to a method for operating a transmission device provided with at least one oil chamber, in which is arranged a wheel set of the transmission device. The invention further relates to a transmission device.

The transmission device is arranged for example in a motor vehicle, for instance as a constituent part of the motor vehicle. In this respect, it is operatively connected with a drive device from which a torque can be provided to its input shaft. The transmission device is usually a gearbox device, preferably an automatic transmission device. It therefore makes it possible to set one of several available gear transmission ratios. The transmission device is provided with at least six oil chambers, in which the wheelset of the transmission device are arranged.

The wheelset is provided with at least one gear train, in particular a spur gear, a bevel gear and/or a planetary gear. Several such gear trains are preferably arranged in the oil chamber. Lubricant or oil is supplied to the oil chamber, in order to lubricate the wheelset on the one hand, and on the other hand also to dissipate the heat from the oil chamber. The heat is generated in particular as a result of the friction within the wheelset. For example, the oil chamber is provided with dry sump lubrication, which is preferably equipped with a lubricant pump or an oil pump.

It is desirable to determine the temperature of the oil chamber, or the temperature that is present in the oil chamber, in order to implement protection of structural components on the basis of the temperature and/or to control and regulate the lubricant pump. The protection of components is applicable in particular to the wheelset and/or to the lubricant means, which decomposes under certain circumstances if a certain maximum temperature is exceeded. The temperature of the oil chamber can be determined for example by using a temperature sensor. However, this is costly. In addition, the temperature in the oil chamber can no longer be determined in the event of a failure of the temperature sensor.

SUMMARY OF THE DISCLOSURE

The object of the invention is to propose a method for operating a transmission device which has advantages over the prior art, in particular in that it provides a cost effective method for determining the temperature in the oil chamber.

This is achieved according to the invention by a method having the features of claim 1. In order to determine the temperature in the oil chamber, an overall energy level is determined at the start of the operation of the transmission device according to the following steps: determining a standardized shutdown time as a function of outside temperature as well as of the overall energy level that is present when the transmission device is shut down; determining a corrected shutdown time as a function of the standardized shutdown time and a measured shutdown time; and determining the initial value as a function of the corrected shutdown time and of the momentary external temperature.

The model of the temperature in the oil chamber should not used directly since the entire energy level should be used instead. The temperature can be subsequently determined from this when it is necessary to determine the temperature. The overall energy level corresponds, for example, to the internal energy in the oil chamber and it is thus preferably proportional to enthalpy.

Since the entire energy level is not known immediately or after the initiation of the operation of the transmission device, which is to say after the start of the operation, the initial value is first determined for the overall energy level. It is preferred when the overall level is set to this initial value immediately after the initial value of the overall energy has been determined. The initial value is determined from different variables, in particular, it is present as a function of the outside temperature, as well as a function of the overall energy level which is present when the transmission device is shut down, and as a function of the measured shutdown time, as well as of the momentary external temperature. The variables mentioned here are present as input variables, while the initial value results are obtained as output variables from the calculation.

Two variables are used first, which were present previously, in particular during the immediately preceding status, when the transmission device was shut down or off line, namely the external temperature and the overall energy level. These variables are stored when the transmission device is shut down, for example in a control device, in particular in nonvolatile memory, preferably in EEPROM or in a flash memory device. The standardized shutdown time is determined from these values. The standardized shutdown time will be in this case the higher the higher the stored external temperature and the greater the stored overall energy level. The determination of the standardized shutdown time can be in principle carried out in any manner, for example by using a mathematical formula, a table and/or a characteristic diagram.

Further, the corrected shutdown time is determined from the standardized shutdown time, as well as from the measured shutdown time. In particular, the corrected shutdown time result is obtained by subtracting the measured shutdown time from the standardized shutdown time. The measured time in this case corresponds to the actual time period determined by means of a time measuring device timer from the shutdown time of the transmission device until another operating time.

Under the term standardized shutdown time is understood a time period after which after the shutdown, the temperature of the oil chamber has been adjusted to the external temperature. At a certain external temperature, the energy level is adjusted by itself without any additional supplied energy in dependence on the overall energy level or enthalpy, with the temperature trend over time. This trend can be represented for example in the form of a cooling curve. The curve of the trend is flatter the smaller the difference between the external temperature and the temperature of the oil chamber. At the same time it is assumed that this temperature is proportional to the overall energy level. Therefore, every overall energy level can be associated with the corresponding standardized shutdown time, in particular in dependence on the external temperature, preferably the external temperature at which the shutdown occurred.

The initial value is then determined from the corrected shutdown time and from the momentary external temperature. This can be carried out essentially in any manner, for example by using a mathematical formula, a table and/or a characteristic. The function, which is applied to the determination of the initial value from the corrected shutdown time and from the momentary external temperature, is for example the inverse function of the very function that was applied to determine the shutdown time from the external temperature and from the overall energy level. The standardized shutdown time describes the surplus of the overall energy level in dependence on the external temperature with the shutdown of the transmission device. To this end, the corrected shutdown time is analogous to the theoretical surplus of the overall energy level that is still present in dependence on the momentary external temperature. Therefore, the initial value can be determined from this.

Based on the initial value, for example an energy accounting operation can now be carried out so that the overall energy level can be always applied during the operation of the transmission device in order to determine, at least approximately, the temperature of the oil chamber, for example as the temperature in the oil chamber.

According to another embodiment of the invention, the overall energy level is set to equal the initial value at the start of the operation. Such an embodiment has already been discussed here. First, the initial value is determined at the start of the operation according to the embodiments described above. Immediately afterwards, the overall energy level is set to equal this initial value. If the overall first operation start of the transmission device is provided, although stored outer temperature and stored overall energy level are not provided, these values are set for example to equal the usual standard values, which are preferably stored in the control device of the transmission device.

According to a preferred embodiment of the invention, the overall energy level is during the operation of the transmission device periodically incremented by the amount of the supplied energy and decremented by the amount of the expanded energy. As was already mentioned above, an energy accounting operation is thus performed during the operation of the transmission device. The supplied energy supplied and the expanded energy are in this case preferably absolute values, which are always indicated with a positive sign. However, under certain environmental conditions, they can be also negative.

For example, the incrementing and/or decrementing of the overall energy level is performed periodically, in particular regularly. For example, the time difference between two immediately adjacent time points at which the adjusting of the overall energy level is carried out corresponds to at least 5 milliseconds, at least 10 milliseconds, at least 20 milliseconds, at least 30 milliseconds, at least 40 milliseconds, at least 50 milliseconds, at least 60 milliseconds, at least 70 milliseconds, or at least 80 milliseconds.

According to a particularly preferred embodiment of the invention, the supplied energy is determined as a function of a loss torque of the transmission device, of the number revolutions and of a time difference. The determined variable of the supplied energy thus describes the energy that is supplied to the transmission device or to the oil chamber during the time difference. The loss torque can be selected for example as constant, although it is preferably dependent on the currently engaged gear of the transmission device, which is to say to on the currently available transmission ratio.

The rotational speed corresponds to an input rotational speed of the transmission device, which is to say to the rotational speed of the drive shaft or of the input shaft. The time difference preferably corresponds to the difference between two points in time immediately following one another, at which the determination of the supplied energy or of the adjusting of the overall energy level was carried out. It goes without saying that it is also possible that the supplied energy is determined integrally from the loss torque and the rotational speed. In this case, the time difference is infinitesimally small.

The determination of the supplied energy can be obtained for example by using the formula:

$$E = M_{loss} \cdot n_{input} / 9550 \cdot \Delta t$$

In this case, E corresponds to the supplied energy, $M_{loss}$ corresponds to the loss torque, $n_{input}$ corresponds to the rotational speed and $\Delta t$ is the time difference.

According to a further development of the invention, the supplied energy is determined as a function of the overall energy level and of a temperature of an adjacent oil chamber. This can be provided additionally or alternatively to the above described procedure. In addition to the oil chamber already described above, an adjacent oil chamber, in particular an immediately adjacent oil chamber, can be provided. While the wheelset of the transmission device was present in the oil chamber as mentioned previously, in the adjacent chamber can be arranged at least one actuator device, by means of which for example the transmission ratio of the transmission device can be adjusted. To this end, the actuator is preferably operationally connected with the wheelset or at least with one of the wheelsets.

The adjacent oil chamber is also preferably supplied with oil or provided with a lubricant means. If the temperature of the adjacent oil chamber is higher than that of the oil chamber, the heat from the adjacent oil chamber is transmitted to the oil chamber by heat conduction. The greater the difference between the temperature of the adjacent oil chamber and the temperature of the oil chamber, the greater the energy amount which is supplied to the oil chamber from the adjacent oil chamber. It is preferred when this relationship is applied within the context of the accounting to the entire energy level as a function of the entire energy level and of the temperature of the adjacent oil chamber. The temperature is determined for example by means of a temperature sensor, so that the temperature sensor is preferably on or at least present in the adjacent oil chamber.

According to another embodiment of the invention, the removed energy is determined as a function of the external temperature, of the driving speed and of the overall energy level. The lower the external temperature, the more the energy will be discharged from the oil chamber in the direction toward the external environment. The driving speed also has an important influence on the amount of the discharged energy, in particular, the greater the energy, the greater the driving speed. The discharged energy total is a function of the external temperature, of the speed of the vehicle and of the overall energy level. The driving speed is in particular the speed of the motor vehicle, which is associated with the transmission device. It is preferably determined by means of a control device of the motor vehicle and for example transmitted to the control device of the transmission device.

In a particularly preferred embodiment of the invention, several output characteristic diagrams are provided for determining the discharged energy for different external temperatures in dependence on the driving speed and on the overall energy level value for extracting raw energy and creating a raw energy diagram, in which the different external temperatures are plotted.

Therefore, several diagrams or output characteristic diagrams are provided, which set the raw energy extraction for different external temperatures in dependence on the driving speed and the overall energy level. For example, the output characteristic diagrams are provided for at least two, at least three, at least four, at least five or at least six different external temperature Preferably, the external temperatures for which these diagrams are provided are spaced apart from each other according to the same temperature difference. For example, the characteristic diagrams are provided for external temperatures at −10° C., 0° C., 10° C., 20° C. and/or 30° C. It goes without saying that characteristic diagrams do not need to be provided for all named external temperatures. If is possible to provide characteristic diagrams for example only for −10° C., +10° C., +20° C. and +30°.

The driving speed and the overall energy level serve as input variables of the output characteristic diagram. Raw energy extraction is used as the output variable for each external temperature. As was already discussed, the relevant raw energy extraction is read out from several output characteristic diagrams, in particular from all output characteristic diagrams. These values are then plotted in the raw energy diagram to be created so that the raw energy extraction pertaining to the different external temperatures is plotted in this manner. In this respect, multiple output characteristic diagrams are combined in the raw energy characteristic diagram in dependence on the driving speed and the overall energy level.

According to a preferred embodiment of the invention, after the raw energy characteristic diagram has been constructed, the raw energy characteristic extraction is read out from the raw energy characteristic diagram by using the external temperature. In this respect, the actual raw energy extraction can be ultimately determined from the raw energy characteristic diagram constructed in the manner described above, wherein the momentarily present external temperature forms the basis of the input variable.

Finally, in another preferred embodiment, the discharged energy corresponds to the extraction of the raw energy, or it is determined from a correction factor of the raw energy extraction, wherein the correction factor is determined from the operating state of the oil pump associated with the oil chamber. The energy that is theoretically discharged from the oil chamber can be thus directly equated with the extraction of raw energy. However, it is particularly preferred when an additional correction factor is provided so that the discharged energy results from a multiplication of the raw energy extraction and this correction factor.

The correction factor can take into account for example at least an operating variable of the transmission device, for example the operating state of the oil pump, with which the oil chamber is fluidically associated. This should be understood to mean that the oil pump serves to supply a lubricant to an oil chamber, or to remove it from an oil chamber. The oil pump is thus a constituent of a lubricant circuit, in which the oil chamber is also present. Since the operating state of the oil pump is in the simplest case the activation state, the corrector factor is selected depending on whether the oil pump is or is not being operated.

However, it is also possible to provide a correction factor wherein the correction factor is determined in dependence on the rotational speed of the oil pump and/or the amount supplied by the oil pump. For example, the correction factor is set as being equal to a first value when the rotational speed of the oil pump is smaller than or equal to the first rotational speed. On the other hand, if it is greater than the first rotational speed, the correction fact is set to be equal to a second value. In this case it is preferred when the second value is different from the first value.

Of course it can also be provided that the correction factor is determined from the rotational speed with a mathematical formula, wherein there is for example a linear relationship between the correction factor and the rotational speed. In this respect, the correction factor is for example proportional to the rotational speed. However, a correction factor that is disproportional or less than proportional to the rotational speed can be obviously also provided.

The invention further relates to a transmission device, in particular a transmission device for carrying out the method in accordance with the embodiments described above, wherein the transmission device is provided with at least one oil chamber in which is arranged a wheelset of the transmission device. In this case, the transmission device is designed to determine an overall energy level in the oil chamber for determination of the temperature for the oil chamber, wherein an initial value is determined for the overall energy level at the start of the operation of the transmission device according to the following steps: determination of a standardized shutdown time as a function of an external temperature as well as of the overall energy level present when the transmission device is shut down; determination of a corrected shutdown time as a function of the standardized shutdown and of a measured shutdown time; and determination of the initial value as a function of the corrected shutdown time and of the momentary external temperature.

The advantages of such a procedure and such a configuration of the transmission device were already mentioned. Both the transmission device and the method can be further developed in accordance with the embodiments above so that reference will be made to them in this regard. For example, the transmission device is equipped with a control device, which is provided to determine the overall level for the oil chamber.

The invention relates of course also to a motor vehicle provided with a transmission device according to the embodiments described above.

DETAILED DESCRIPTION OF THE DRAWING

The invention will now be explained with respect to the embodiments illustrated in FIGS. 1 and 2, without limiting the invention in this manner.

The transmission device is preferably a gearbox device, in particular an automatic transmission device. The transmission device is preferably a constituent of a motor vehicle, or more specifically of a drivetrain of a motor vehicle. The transmission device is in this respect on the one hand operatively connected or can be operatively connected with a drive device of the motor vehicle, and on the other hand it is operatively connected with at least one drivable axle of the vehicle.

Figure 2:
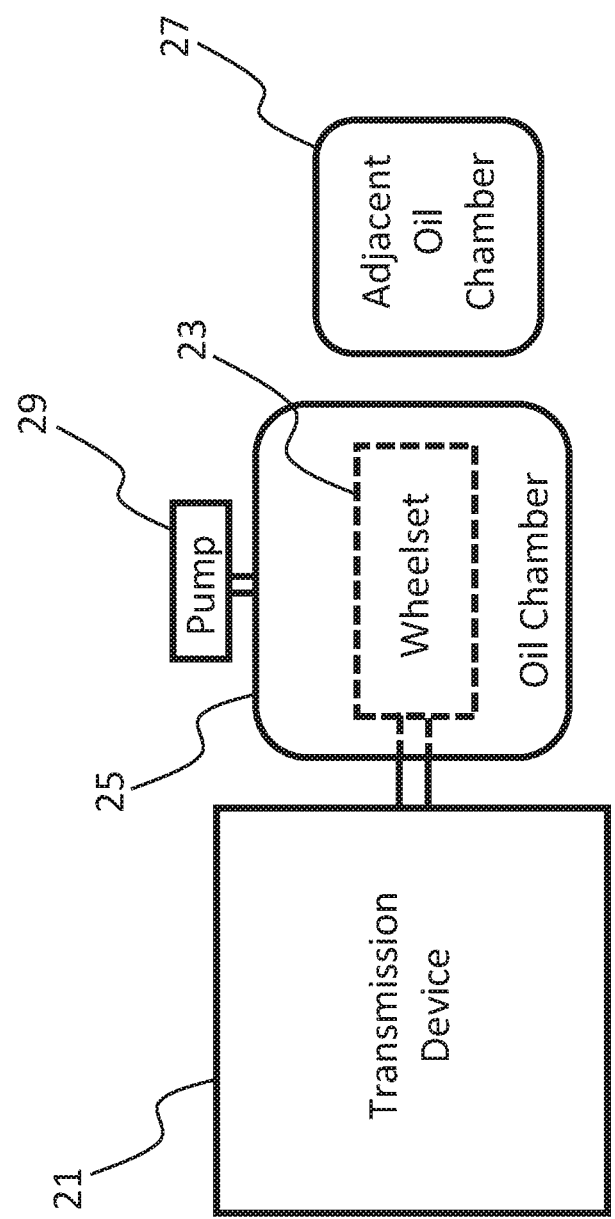
FIG. 2 shows exemplary configurations of the transmission device with the oil chamber.

Referring to FIG. 2, the transmission device 21 is provided with an oil chamber 25 in which is arranged a wheelset 23 of the transmission device 21. The wheelset 23 is equipped with at least one gear transmission, for example a spur gear, a bevel gear and/or a planetary gear. In particular, the wheel set 23 is provided with several such gear transmissions. In addition to this oil chamber 25, another oil chamber 27 is also provided, arranged so that it is adjacent to the oil chamber 25. In this adjacent oil chamber 27 is arranged at least one actuator, which is used in particular for adjusting to a desired transmission ratio at the transmission device. For this purpose, the activator is for example connected with the wheelset 23 of the transmission device 21.

A lubricant or oil is supplied both to the oil chamber 25 and to the adjacent oil chamber 27. The oil chamber 25 is for this purpose preferably provided with dry sump lubrication. This can be provided also in the case of the adjacent oil chamber 25.

Figure 1:
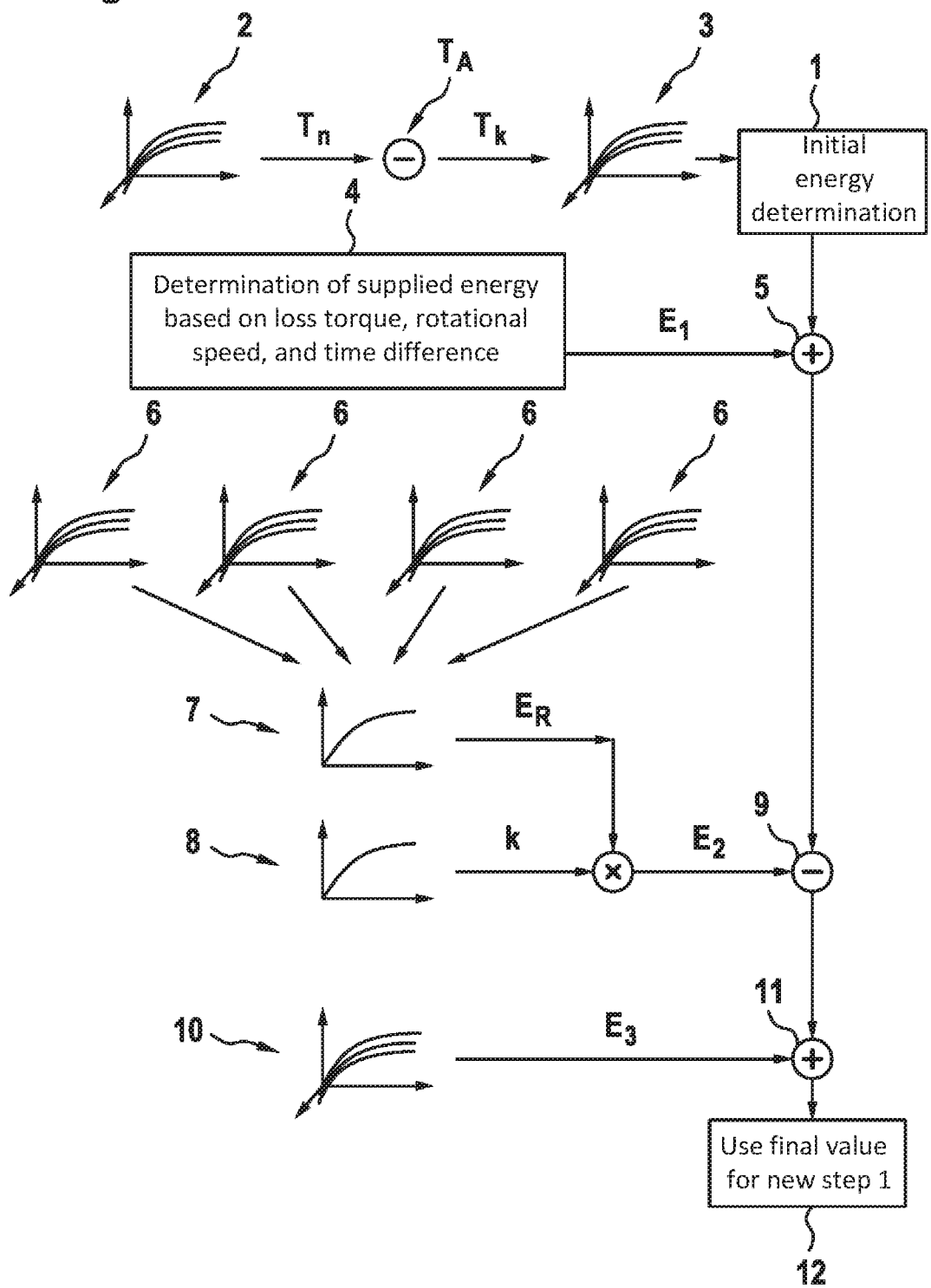
FIG. 1 shows a flowchart indicating a method for operating a transmission device, in particular in order to determine an overall energy level for an oil chamber of the transmission device.

In order to determine the temperature in the oil chamber 25, an overall energy level is determined for the oil chamber 25. The method described with reference to the process flow diagram which is shown in FIG. 1 is used for this purpose. Referring now to FIG. 1, within the context of an initial value step 1, the overall energy level to be determined is first set so that it is either equal to a stored overall energy level, or—if the determination follows immediately the start of the operation of the transmission device 21—so as to be equal to an initial value for the overall energy level.

The initial value is described as follows: First, a standardized shutdown time is determined. As input variables for the external temperature characteristic diagram 2 is in this case used an external temperature and the overall energy level, which was present immediately when the transmission device was previously shut down. The standardized shutdown time Tn is determined from the external temperature characteristic diagram 2. A measured shutdown time TA is derived from this value, so that the result is provided as a corrected shutdown time Tk. This is then again applied, in addition to the momentary external temperature, as an input variable for the momentary external temperature characteristic diagram 3. From this is then derived the initial value for the overall energy level. As was already mentioned, the overall energy level is set at the start of operations to equal the initial value as soon as this value is determined.

During the operation of the transmission device, the overall energy level is incremented starting from the value determined in the initial value step 1 by the supplied energy and decremented by the discharged energy. The former is determined at least partially within the context of supplied energy step 4, wherein the supplied energy is obtained from a function wherein as input variables are used a loss torque of the transmission device, the rotational speed, and a time difference.

This can be based for example on the following formula:

$$E_1 = M_{loss} \cdot n_{input} / 9550 \cdot \Delta t$$

wherein E corresponds to the supplied energy, $M_{loss}$ corresponds to the loss torque of the transmission device, and $n_{input}$ corresponds to the input rotational speed and $\Delta t$ is the time difference between immediately successive points in time at which the supplied energy is determined or the overall energy level is updated.

The supplied energy E1 is applied within the context of incremented energy step 5 to the overall energy level. After that, the discharged energy is determined. Several output characteristic diagrams 6 are provided for this purpose, each of which takes into account a raw energy extraction for different external temperatures for a driving speed and sets the overall energy level.

In this respect, a value is read from the output characteristic diagram 6 for the raw energy extraction, wherein this is done in dependence on the driving speed and on the overall energy level. The values that are read out from the output characteristic diagram 6 are then applied in a raw energy characteristic diagram 7 in dependence on the different external temperatures. From each output characteristic diagram 6 will therefore result a certain value for the raw energy extraction for a certain external temperature.

In the raw energy characteristics diagram 7 is now each of these values applied for the raw energy extraction above the respective value of the external temperature. After creating the raw energy characteristic diagram 7, the raw energy extraction $E_R$ is read out from the raw energy characteristic diagram 7, wherein the momentary external temperature serves as an input variable. In addition, a correction factor k is determined, for example by means of another characteristic diagram 8. For example, linear interpolation is used when reading from the raw energy characteristic diagram 7 and/or the next characteristic diagram 8. The discharged energy $E_2$ now is now obtained from a multiplication of the raw energy extraction and the correction factor k, resulting in the following formula:

$$E_2 = E_r \cdot k.$$

The correction factor k can be determined from an operating state of an oil pump 29 (shown in FIG. 2) that is fluidically associated with an oil chamber 25. For example, the correction factor is related to the rotational speed of the oil pump 29. The derived energy E2 determined in this manner is deducted within the context of decremented energy step 9 from the overall energy level.

Finally, another part of the supplied energy, which is here referred to as E3, is determined from the overall energy level and from a temperature of the adjacent oil chamber. For example, the adjacent oil chamber temperature characteristic diagram 10 is used for this purpose. The supplied energy E3 is again supplied to the overall energy level within the context of second incremented energy step 11. If the overall energy level is considered as an input variable for the use of the overall energy level within the context of the present description, then this always means the value of the overall energy level which is present during the initial value step 1 or immediately after the initial value step 1.

A new value is thus obtained with the procedure described above for the overall energy level, which is then stored. After that, the procedure described here is periodically repeated so that for example after a certain time period, the procedure is branched back to the initial value step 1. Because during the operation of the transmission device, only one value is present for the overall energy level, the determination of the initial value does not have to be carried out again, so that the overall energy level that was present for the overall energy level within the context of step 12 is then set within the context of the initial value step 1.

When the transmission device is turned off, or when the operation is finished, the overall energy level and the current temperature are stored, in particular in a storage device of the transmission device.

A cost-effective and reliable method for determining the temperature in the oil chamber is thus implemented by using the procedure described above. In particular, a possibility described here is to bridge over time the period when the transmission device is idle, while an accurate estimate of the temperature required for an overall energy level can still be carried out at the same time.

The invention claimed is:

1. A method for operating a transmission device provided with at least one oil chamber and a pump, a control device communicatively coupled to one or more memory devices and one or more timers, in which is arranged a wheelset of the transmission device, the pump configured to supply oil to the oil chamber based on a determined temperature in the at least one oil chamber, wherein in order to determine the temperature in the at least one oil chamber, an overall energy level is determined for the at least one oil chamber, wherein an initial value is determined for the overall energy level at the start of the operation of the transmission device comprising the following steps:

determining, by the control device, a standardized shutdown time as a function of an external temperature and of the overall energy level that is present at a shutdown preceding the start of the operation of the transmission device, wherein the standardized shutdown time is the span of time after the shutdown at the end of which the temperature in the at least one oil chamber has adjusted to the external temperature, determining, by the control device, a corrected shutdown time as a function of the standardized shutdown time and of a measured shutdown time, and determining, by the control device, an initial value as a function of the corrected shutdown time and of the momentary external temperature.

2. Method according to claim 1, wherein the overall energy level is set to be equal to the initial value at the start of the operation.

3. Method according to claim 1, wherein during an operation of the transmission device, the overall energy level is periodically incremented by a supplied energy and decremented by a discharged energy.

4. Method according to claim 1, wherein a supplied energy is determined as a function of a loss torque of the transmission device, of the rotational speed and of a time difference.

5. Method according to claim 1, wherein a supplied energy is determined as a function of the overall energy level and of the temperature of an adjacent oil chamber.

6. Method according to claim 1, wherein a discharged energy is determined as a function of the external temperature, of a driving speed and of the overall energy level.

7. Method according to claim 1, wherein different external temperatures are applied in order to determine discharged energy from a plurality of output characteristic diagrams for different external temperatures in dependence on the driving speed and the overall energy level for extracted raw energy, and to create a raw energy characteristic diagram.

8. Method according claim 1, wherein after creating a raw energy characteristic diagram, a raw energy extraction is read from the raw energy characteristic diagram while using external temperature.

9. Method according to claim 1, wherein a discharged energy corresponds to an energy extraction, or is determined from a correction factor, wherein the correction factor is determined from the operating state of an oil pump that is fluidically associated with the at least one oil chamber.

10. A transmission device, comprising:
    one or more memory devices;
    one or more timers; and
    a control device communicatively coupled to the one or more memory devices and the one or more timers;
    at least one oil chamber, in which is arranged a wheelset of the transmission device, said oil chamber connected to a pump configured to supply oil to the oil chamber based on a determined temperature in the at least one oil chamber, wherein the transmission device is designed to determine the temperature in the at least one oil chamber so as to determine an overall energy level for the at least one oil chamber based on the determined temperature, wherein, in order to determine the temperature in the at least one oil chamber, an initial value is determined for the overall energy level at the start of the operation of the transmission device with the determination of a standardized shutdown time, by the control device, as a function of an external temperature and of the overall energy level that is present at the shutdown preceding the start of the operation of the transmission device, wherein the standardized shutdown time is the span of time after the shutdown at the end of which the temperature in the at least one oil chamber has adjusted to the external temperature,
    determination of a corrected shutdown time, by the control device, as a function of the standardized shutdown time and of a measured shutdown time, and
    determination of an initial value, by the control device, as a function of the corrected shutdown time and of the momentary external temperature.

* * * * *